(No Model.) 2 Sheets—Sheet 1.
F. G. & A. C. SARGENT.
MACHINE FOR DRYING WOOL.
No. 302,287. Patented July 22, 1884.
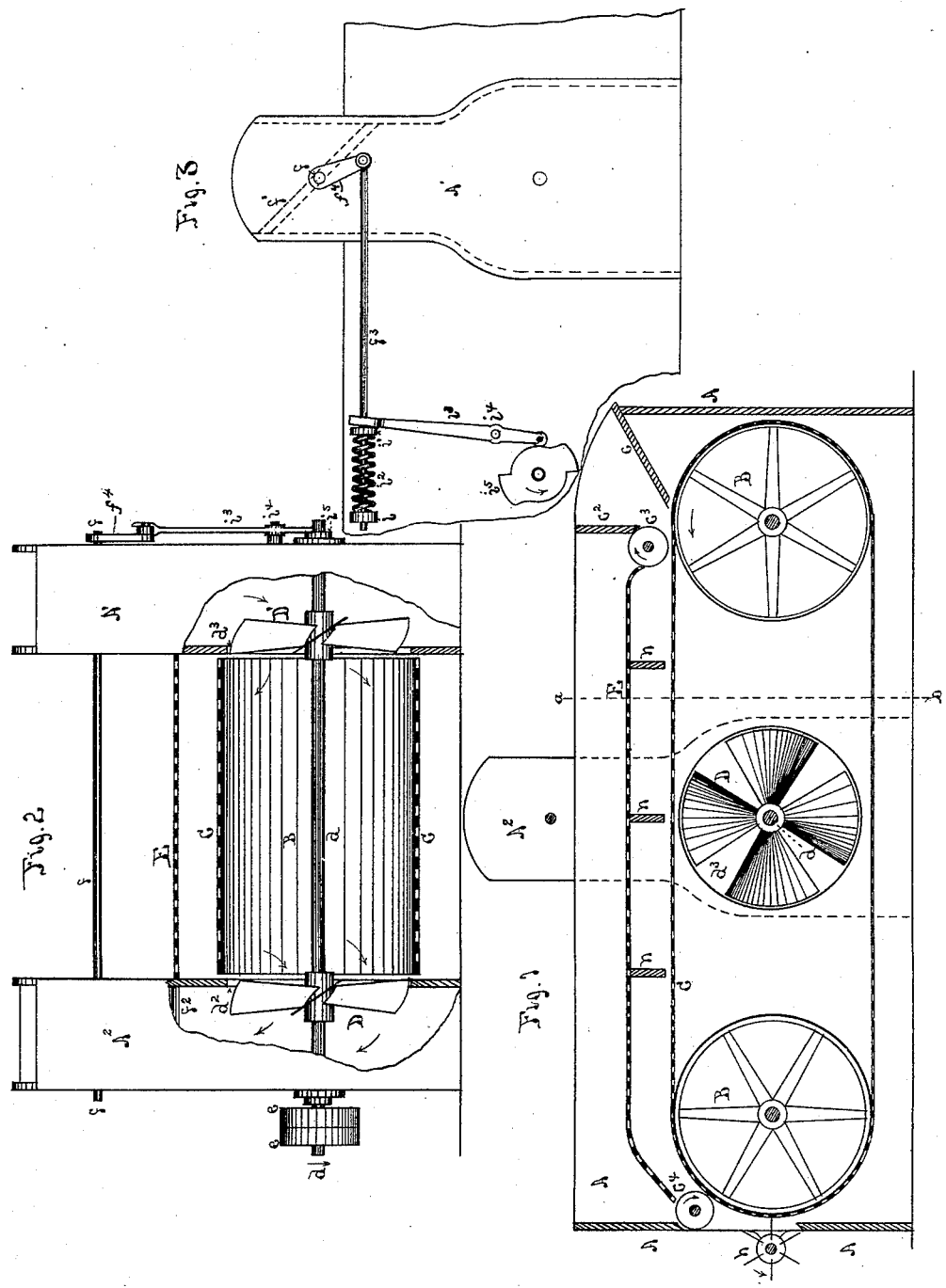

(No Model.)

F. G. & A. C. SARGENT.
MACHINE FOR DRYING WOOL.

No. 302,287. Patented July 22, 1884.

UNITED STATES PATENT OFFICE.

FREDERICK G. SARGENT AND ALLAN C. SARGENT, OF GRANITEVILLE, MASS.

MACHINE FOR DRYING WOOL.

SPECIFICATION forming part of Letters Patent No. 302,287, dated July 22, 1884.

Application filed October 12, 1882. (No model.)

*To all whom it may concern:*

Be it known that we, FREDERICK G. SARGENT and ALLAN C. SARGENT, of Graniteville, in the county of Middlesex and State of Massachusetts, have invented a new and useful Improvement in Machines for Drying Wool, of which the following is a specification.

Our invention relates to machines for drying wool and other fibrous materials, wherein they are placed upon screens in a loose condition, and a current of air forced or drawn through the mass to dry it.

The invention consists in alternately forcing and drawing, or intermittently forcing or drawing, a current of air, or air charged with drying constituents, through the fiber, thus preventing the fiber from becoming matted down and consolidated by the force of the air-current flowing constantly in one direction, and loosening and opening it up in the drying process, the invention being carried out substantially as hereinafter described.

Figure 4:
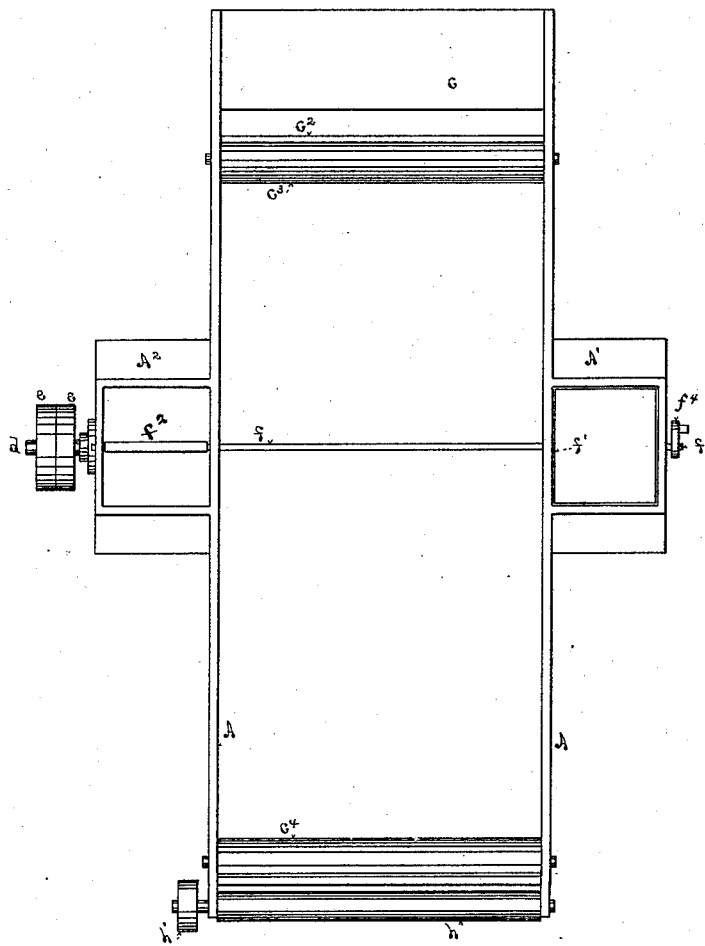
Figure 5:
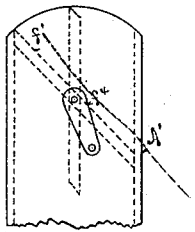

In the drawings, Figure 1 is a longitudinal vertical section of a wool-drying machine containing our invention. Fig. 2 is a transverse section of the machine on the line $a\ b$ of Fig. 1. Fig. 3 is a view of part of one side of the machine, showing the mechanism for working the dampers which close and open the air-draft. Fig. 4 is a top plan view of the machine, showing the dampers $f'\ f^2$ in their air-passages, as hereinafter described. Fig. 5 is a side elevation of part of one of the air-conduits, showing in dotted lines the open and closed positions of the damper in it, as hereinafter described.

A is the sides and ends of the machine, which is open at the top.

$A'\ A^2$ are the casings of the air-drafts and fans.

B B are two drums carrying the endless wire-screen C, upon which the wool is carried through the machine in the drying process.

D D' are the fans for producing the alternate air-currents, the direction of which is shown by the arrows. These fans are on the same shaft, $d$, which extends across the machine, and has attached to one end the driving and loose pulleys $e\ e'$. They are placed in round holes $d^2\ d^3$, which they just fill connecting the body of the machine with the air-draft conduits $A'$, which are open at the top like a chimney. In these chimneys near the top are dampers $f'\ f^2$, attached to the shaft $f$, which passes through the chimneys. These dampers are so hung upon the shaft $f$ as to open and close alternately—*i. e.*, when one is open the other is closed—by being attached to the shaft, so that when one stands as shown in Fig. 3 in dotted lines the other shall stand vertically. They operate in closing the chimney like ordinary stove-pipe dampers, as follows: To the shaft $f$ is attached the crank $f^4$. On the crank is a rod, $f^3$, which plays freely back and forth through a hole in the ear $i$, attached to the side of the machine. A collar, $i'$, is secured to the rod $f^3$, and a spiral spring, $i^2$, on the rod between ear $i$ and collar $i'$ by its expansion keeps the crank $f^4$ in the position shown in Fig. 3. A lever, $i^3$, is pivoted to the side of the machine at $i^4$ and has one end bearing against the collar $i'$ and the other against the cam $i^5$, which is attached to the projecting end of the shaft of one of the drums B. It is evident that as B revolves once the cam $i^5$ will open and close the dampers alternately twice, because cam $i^5$ moves lever $i^3$, which moves endwise rod $f^3$, which swings crank $f^4$, and the spring $i^2$ brings it back as the cam continues to revolve.

The lower part of the body of the machine is of course tightly closed to prevent air escaping in that direction. An inclined plane, $c$, is placed at the top of the machine at one end, which, with the vertical partition $c^2$, forms a hopper to feed the wool upon the traversing screen C. A feed or compression roll, $c^3$, carries forward the wool out of the hopper over the air-blast, and prevents the escape of air through it. Over the whole length of the apron C, from feed-roll $c^3$ to the feed-out roll $c^4$, is placed the perforated top or screen E, which catches and holds the wool as it rises, when the air-blast is from within outward and upward. This screen E is so placed as to leave an open space between it and the perforated apron C, to allow the fiber to lie loosely upon the latter and be lifted and opened up by the force of the air-draft from beneath, and this open space is important in effecting the drying process. The feed-out roll $c^4$ not only aids to convey away the wool, but prevents the escape of air at that end of the apron C. Below the feed-out roll $c^4$ we place a doffer, $h$, of ordinary construction, to remove any fiber which does not drop off from apron C. Feed-in roll $c^3$, feed-out roll $c^4$, and doffer $h$ revolve in the ordinary and well-known manner, a pulley, $h'$, being attached to the end of the latter's shaft, as in other wool or cotton machines containing similar doffers, where that shaft projects beyond the side of the machine represented in Fig. 1. On the lower side of screen E we place transverse partitions $n\ n\ n$, depending vertically downward for some distance from the screen, as shown, which serve to keep the wool from bunching or mixing up when it rises by the blast from below.

The operation of the machine is as follows: The wool being fed upon the apron C, and the latter moving forward as cam $i^5$ revolves and is in the position shown in Fig. 2, the damper $f'$ in the right-hand chimney A' of Fig. 1 will be closed, and fan D will draw its air down through screen E and apron C, and expel it through the left-hand chimney A', the damper of which is open. This brings the draft downward through the wool and holds it upon apron C. As cam $i^5$ continues to revolve, it brings its larger part against lever $i^3$, and opens the damper in the right-hand chimney A', Fig. 2, and closes the damper of the left-hand one. Fan D, now having no air-delivery place, ceases to draw in air, while fan D' draws the air downward through the right-hand chimney and forces it out upwardly through apron C and screen E, thus lifting and opening the wool compressed by the opposite draft. As the cam $i^5$ revolves, it continues to alternate the air-drafts in this manner, and the drying process is greatly facilitated. The screen E prevents the wool from rising too far upon the upward air-blast.

We are aware that various arrangements of air inducts and educts with air-blast machinery and dampers may be used instead of the one we have shown, and we do not limit ourselves to that precise form.

To operate the machine with an intermittent air-draft or air-blast it is only necessary to cover over the upper end of the induct A', or the educt A², as the case may be. The fan and damper in the air-conduit so covered over will then run in dead or stationary air and without any great amount of friction, while the fan and damper in the air-conduit remaining open will create an intermittent air-current through the fiber as it is carried through the machine on the apron C. This will produce a constant vibration in the fibers of the wool by the alternate loosening up and compression of the mass, similar in kind to that produced by alternate currents, and such intermittent blast or draft current is of much greater effect than a steady current in the same direction in removing the moisture from the fiber.

What we claim as new and of our invention is—

1. The combination, in a fiber-drying machine, of the perforated apron C with suitable air-blast and suction mechanism operating to alternately force and draw air through said apron, substantially as described.

2. In combination with the perforated traveling apron C, the mechanism for producing alternate air-currents upward and downward through the same, substantially as described.

3. In a fiber-drying machine, in combination with the perforated traveling apron C, the air-draft fan D, with its air-exit passage A² and damper $f^2$, substantially as described.

4. In a fiber-drying machine, in combination with the perforated traveling apron C, the air-blast fan D' and its air-induct passage A' and damper $f'$, substantially as described.

5. In a fiber-drying machine, the combination of perforated apron C and screen E with suitable blast and draft mechanism, operating alternately to force and draw air through said apron and screen, substantially as described.

6. The combination, in a fiber-drying machine, of the perforated apron C, the screen E, and the partitions $n\ n$, and air-blast mechanism, substantially as described.

7. In combination with the traveling perforated apron C and the screen E, and suitable alternately-operating air draft and blast mechanism, the feed-in roll $c^3$ and feed-out roll $c^4$, substantially as described.

8. In combination with the air induct and educt passages A' A², provided with alternately-operating dampers $f' f^2$, actuated by suitable mechanism, the perforated apron C and suitable air draft and blast mechanism adapted to produce alternate currents of air through said apron, substantially as described.

9. The described process of opening and drying fiber by spreading the same in a sheet upon a perforated apron and forcing currents of air alternately upward and downward through the same and the apron, substantially as described.

10. The combination of the shaft $f$, dampers $f' f^2$, crank $f^4$, rod $f^3$, lever $i^3$, and cam $i^5$, substantially as described.

11. The combination of the perforated apron C, air induct and educt passages $d^2 d^3$, leading beneath the same, and suitable air blast and draft mechanism connected therewith, operating alternately and producing alternate inward and outward air-currents through said apron and air-passages, substantially as described.

12. In combination with the perforated traveling apron C and suitable air-blast mechanism for creating currents through the same, the screen E, placed at a sufficient distance above screen C to permit the fiber to be opened up by said currents, substantially as described.

F. G. SARGENT.
A. C. SARGENT.

Witnesses:
ROLAND H. BOUTWELL,
ARTHUR B. PLIMPTON.